May 26, 1970     R. E. GROJEAN     3,514,604

PULSED MICROWAVE LIGHT SOURCE

Filed June 28, 1968     3 Sheets-Sheet 1

INVENTORS
RICHARD E. GROJEAN

BY

ATTORNEYS

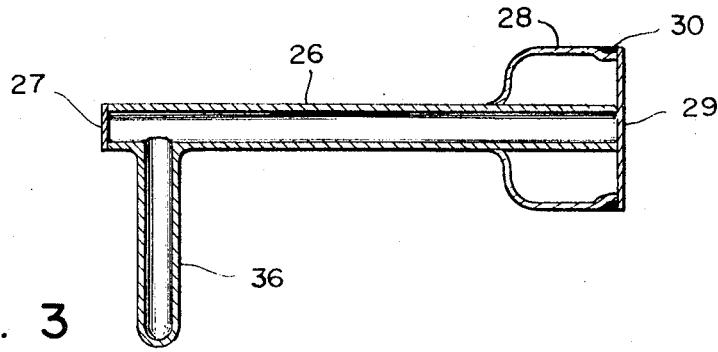
FIG. 3
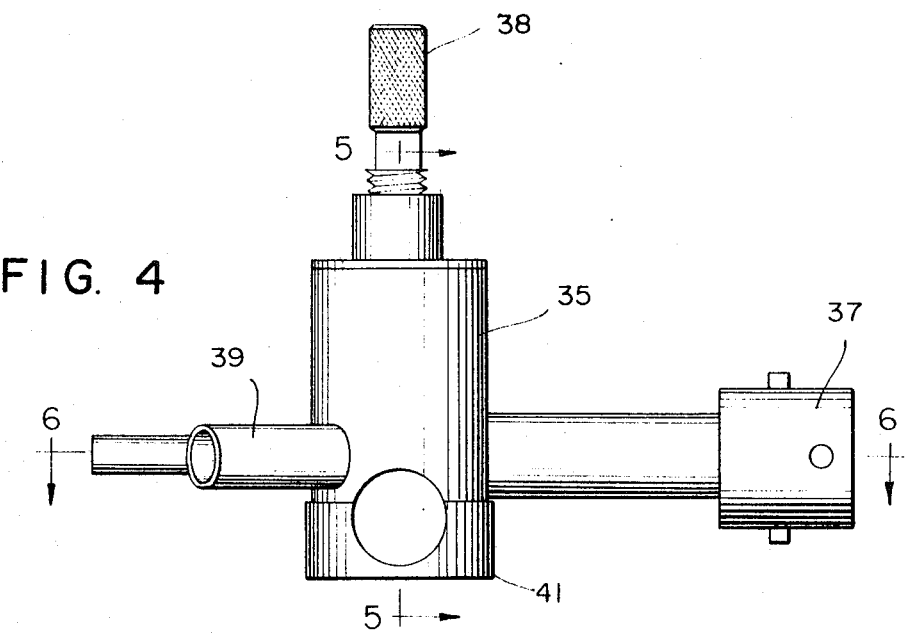
FIG. 4
FIG. 6
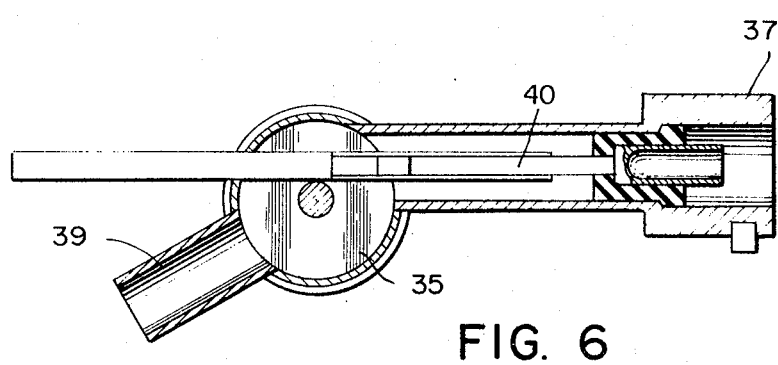
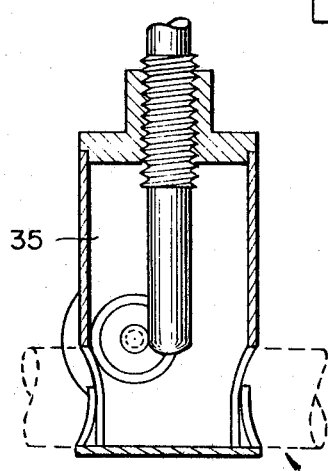
FIG. 5
INVENTORS
RICHARD E. GROJEAN
BY
Kenway, Jenney & Hildreth
ATTORNEYS

United States Patent Office 3,514,604
Patented May 26, 1970

3,514,604
PULSED MICROWAVE LIGHT SOURCE
Richard E. Grojean, North Weymouth, Mass., assignor to McPherson Instrument Corporation, Acton, Mass., a corporation of Delaware
Filed June 28, 1968, Ser. No. 741,036
Int. Cl. H01j 37/00
U.S. Cl. 250—84                                                  9 Claims

ABSTRACT OF THE DISCLOSURE

Gaseous light sources for emitting relatively high intensity radiation in the vacuum ultraviolet region, employing microwave excitation to sustain a gas discharge and provide the energy for exciting gas molecules. A tuned microwave cavity couples the energy from a magnetron to the gas contained in a quartz envelope. The microwave source is operated in the pulsed mode within a specific range of repetition rates with a carefully controlled pulsed duration between 2 and 4 microseconds.

FIELD OF THE INVENTION

This invention relates in general to high intensity light sources and more particularly to a gaseous light source subjected to pulsed microwave excitation.

BACKGROUND OF THE INVENTION

The vacuum ultraviolet region includes ultraviolet radiation characterized by wave lengths between 2,000° A. and 2° A. In the field of vacuum ultraviolet spectroscopy there is a need for high intensity light sources producing a continuum of ultraviolet radiation over different portions of the vacuum ultraviolet region. High intensity sources are important both to improve the resolution of the measurements and to permit measurement of materials characterized by a high absorption factor. Existing light sources for this wave length region are generally divided into two categories. One category consists of an interrupted direct current arc discharge used to excite radiation in a gas volume and the other employs a tuned microwave cavity operating in the continuous wave mode as an exciting source to energize a specified gaseous volume.

The interrupted direct current discharge type of light source produces a relatively high intensity light, however, it is characterized by a relatively limited life. The continuous series of arcs produces a deterioration of the electrode surfaces resulting in the light source becoming inoperative after a relatively short period.

In the microwave excited type of light source an envelope containing an appropriate gas is placed within a tuned microwave cavity. A microwave generator operated at a frequency, typically 2450 mHz., is used to produce the exciting microwaves and the radiation produced within the gas is coupled through an appropriate window to the vacuum ultraviolet spectrometer. With air cooling such microwave excited light sources may be operated up to a maximum power of about 100 watts. At this power level the intensity level of radiation which can be generated from the rare gases, typically argon, xenon and krypton, is insufficient to serve as a useful high intensity source. Increasing the power applied by the microwave generator results in only a slight increase in light intensity and involves further complication of the apparatus in that water cooling must be utilized. Since the water is a significant absorber of microwave energy, the problem of coupling the microwave energy to the gas envelope becomes somewhat involved.

SUMMARY OF THE INVENTION

Broadly speaking, the vacuum ultraviolet light source of this invention employs a gas volume placed within a tuned microwave cavity and excited by a microwave source operated in the pulse mode within a specific range of pulse repetition rates and using a carefully controlled pulse width. It has been found that, utilizing this technique, a pulsed source operated at an average power level of, for example, 10 watts, can produce a light intensity ten times the intensity of a light source excited by a continuous microwave source at an average power of 100 watts. The microwave cavity used for transferring the energy to the gas, typically a rare gas enclosed in a quartz envelope, is a conventional tuned microwave cavity. The microwave energization produces very steep field gradients, which result in the production of ions in very short path lengths and this, together with the relatively high frequency reversal of field direction, inhibits the mobility of the produced ions. Hence there is very little interaction between the excited gas particles and the walls of the envelope. The apparatus is operated at a duty cycle between 2 and 10% which minimizes the dissipation of heat thereby simplifying the cooling problems.

The extraordinary increase in light intensity, at least an order of magnitude over that which would be predicted on the basis of the average power, results from the discovery that there is a critical pulse width and range of pulse repetition rates, within which there is a maximum efficiency for vacuum ulraviolet ray production by an excited gaseous source. This efficiency results from operation under conditions where there is a dynamic balance between production of ions and disassociation of excited molecular states and wherein the net difference in the rates between these two processes is responsible for the ultraviolet emission.

DESCRIPTION OF THE DRAWING

In the drawing:
FIG. 3 is an illustration of a quartz envelope suitable for containing the gas in a light source constructed in accordance with the principles of this invention;
FIG. 4 is a perspective view of a tuned microwave cavity suitable for use in the practice of this invention;
FIG. 5 is a cross sectional view of the cavity of FIG. 4 taken along the line 5—5;
FIG. 6 is a cross sectional view of the cavity taken along the line 6—6.

DESCRIPTION OF PREFERRED EMBODIMENTS

Figure 1:
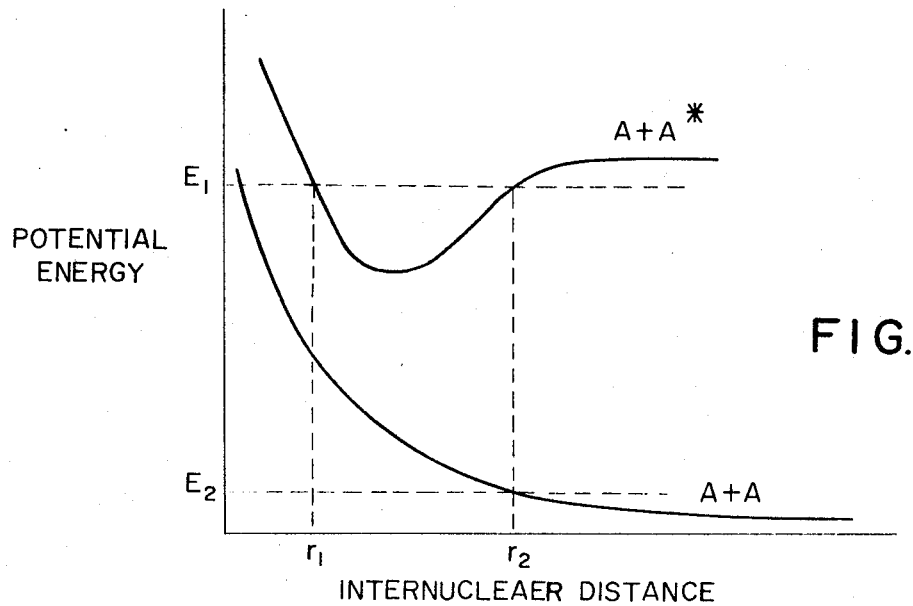
FIG. 1 is an illustration of the potential energy curve of a rare gas as a function of internuclear distance.

With reference now to FIG. 1, there are illustrated typical potential energy curves for a rare gas as a function of internuclear distance. In general, the processes involved in the production of a rare gas light continuum involve a transition from a metastable excited electronic state of a gas molecule to a lower repulsive state. In FIG. 1 the curve designated $A+A^*$ depicts the energy distribution as a function of the internuclear distances between the atoms with the molecule in the excited state. If $E_1$ is the energy level above which disassociation occurs, then it can be seen that there is a range of energy values which this excited molecule may have in its metastable condition. In FIG. 1, the curve $A+A$ illustrates the distribution of energy in the repulsive (usually the ground) state of the molecule as a function of internuclear distance. There is a finite probability that a molecule in the excited state will emit radiation and thereby undergo a transition to the repulsive state. This transition may be initiated from any energy state between internuclear distances $r_1$ and $r_2$ of the excited molecule and hence the transitions produce a radiation continuum in the energy range between $E_1$ and $E_2$.

Thus, in order for the rare gas to produce the characteristic continuum, the excited metastable molecular state must first be created. One process for producing this state is to create atomic ions which probably recombine with free atoms in the gas and thereafter acquire an electron thereby producing the excited metastable molecular state. If no further energy is supplied to the gas, the metastable state has a finite probability of emitting radiation, thereby degenerating to the repulsive state and thereafter disassociating again into atoms. The equations below indicate a probable series of reactions for such a process

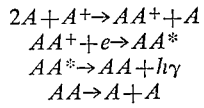

where $A^+$ is the ionized atom and $AA^*$ is the excited molecule.

It has been shown experimentally in the past that the rare gas continuum is an afterglow phenomenon, that is, there is a delay of several microseconds between the application of the exciting field and the peak emission of the light and this light emission decays slowly after is peak.

The same processes for emission of the continuum take place, whether the gas is excited by an arc discharge or an applied microwave field. In the case of the microwave field it is often necessary to apply an initial triggering gradient by means of a radio frequency field to produce the initial discharge, which is thereafter sustained by the microwave energy. Basic to the present invention, is the discovery that, if microwave energy is applied in a short pulse of duration between two and four microseconds, preferably at three microseconds, with a repetition rate of approximately sixty kHz., a light intensity one hundred times that of a continuous microwave excited source may be produced with the same average power applied. The criticality of the upper limit of pulse width and repetition rate is believed to be due to the quenching effect of applying microwave energy at a higher repetition rate or over a longer pulse period. As previously discussed the excited molecules of the rare gases have a finite life in this metastable state before emission and decay to the repulsive state. If, while the molecule is in the excited state, more energy is applied to the gas through either an extension of the exciting pulse or the application of another exciting pulse, the absorption of this additional energy by the already excited gas molecules may result in a disassociation of the molecule into the excited atomic species which then decay by other mechanisms to the ground state.

Experimentally, this is observed by noting that for a repetition rate of sixty kHz. the light intensity increases with increasing pulse duration up to approximately three microseconds and thereafter the light intensity starts to decrease until at a duty cycle of about 50% i.e. a pulse duration of about 15 microseconds, the light intensity for the pulsed mode is substantially equal to that for the continuous wave mode. The pulse duration and repetition rate must be sufficiently long so that an ion density sufficient to sustain the discharge is always maintained within the gas at the particular pressure used. The precise value of the pulse duration and repetition rate will vary slightly depending upon the pressure and the specific gas employed, however, in general these will fall within the ranges of 2 to 4 microseconds pulse duration and 25 to 90 kHz. repetition rate.

Figure 2:
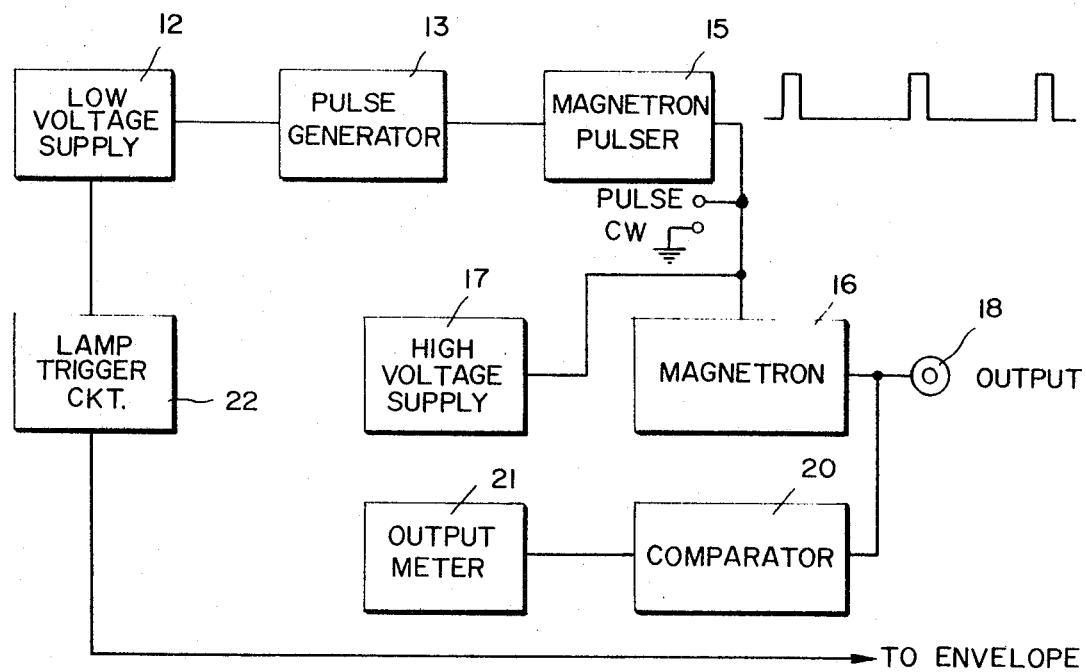
FIG. 2 is an illustration in block diagrammatic form of a pulsed microwave excitation circuit suitable for use in the practice of this invention.

In FIG. 2, there is illustrated in block diagrammatic form a pulsed microwave source for application of microwave energy through a suitable resonant cavity to the gas source. The circuit includes a low voltage supply 12 which provides power to a pulse generator 13. The pulse generator 13 is a conventional two stage circuit which includes an oscillator and a monostable multivibrator triggered by the output of the oscillator. The monostable multivibrator produces rectangular pulses of a specific pulse width and the repetition rate is controlled by varying the frequency of the oscillator. The output of this pulse generator 13 is applied to a magnetron pulser 15, the latter being a conventional output switching circuit which is used to energize the magnetron 16 for periods of time controlled by the width of the output pulse from the generator 13.

The magnetron 16 is a conventional grounded anode-indirectly heated cathode tube which is designed for coupling to a coaxial line. The magnetron 16 typically operates in the frequency range of 2425 to 2475 mHz. at an output power level of 100 watts, and it is coupled to output terminal 18. High voltage is supplied to magnetron 16 from high voltage supply 17, which normally provides high voltage up to 2 kilovolts. Also, coupled to the output of the magnetron is a comparator 20, which includes a dual directional coupler connected to high frequency diodes. The comparator 20 serves the function of determining the percentage of the generator power which is reflected and provides an output signal to output meter 21 which indicates this value. A lamp trigger circuit 22 is also connected to the envelope (not shown) which contains the gas for the light source. The purpose of the lamp trigger circuit 22 is to initiate the discharge in the lamp at the beginning of the operation. After the discharge is initiated this circuit turns off and is no longer utilized, the microwave energization being sufficient to sustain the discharge. The trigger circuit may include a radio frequency coil and an energizing circuit for it.

The circuit of FIG. 2 is arranged to provide a peak power up to 300 watts in the pulse mode and provides microwave energy at a frequency of approximately 2450 mHz. in pulses three microseconds wide at repetition rates between 25 and 90 kHz.

An envelope suitable for containing the gas to be excited as a light source is illustrated in FIG. 3. The envelope is generally formed of a quartz tube 26 having a quartz window 27 at one end and terminating in a bell shaped portion 28 at the opposite end with a window 29 for transmitting the vacuum ultraviolet radiation at the open end of the bell. The window 29 is formed of lithium fluoride and is cemented with epoxy 30 to the bell shaped portion 28 of the envelope. The window 29 can also be formed of magnesium fluoride for rare gases other than argon. An appendix tube 36 attached to the main tube 26 is used to contain the gettering material. The bell portion 28 serves the function of providing that the lithium fluoride or magnesium fluoride window 29 may be sealed to the end of the envelope at a point which will be removed from the discharge in the rare gas, since the latter occurs within the central tube 26. This separation of the epoxy joint from the discharge provides that the heat from the discharge will not produce organic contaminants within the rare gas. The window 27 may be used to provide for light calibration of the spectrometer with a separate light source when the microwave light source is in position.

The gas to be excited is sealed within the envelope 26. In order to produce the rare gas continuums, one of the rare gases must be contained within the envelope 26. Suitable pressures for krypton and xenon have been found to be 200 to 300 millimeters, while argon operates satisfactorily between a pressure of 400 and 600 millimeters and helium at a pressure between 30 and 40 millimeters. Hydrogen may also be employed to produce the hydrogen continuum and pressures below 10 millimeters have been found satisfactory for this gas.

FIGS. 4, 5 and 6 show the tuned microwave cavity which couples the microwave energy from the circuitry to the gas. The cavity consists of the main cylindrical body of the cavity 35, which is generally formed of gold plated brass and into which is axially inserted a tuning stub 38. The gas envelope 26 passes through the cavity in a direction transverse the axis of the cylinder 35. Mounted at right angles to the envelope 26 and also transverse to the axis of the cylinder 35 is a connector 37 which is coupled through a coupling slider 40 to the tunable cavity 35. A port 39 serves to provide for air cooling of the envelope within the cavity. A cap 41 at the bottom of the cylinder is removable so that the envelope 26 may be readily inserted and the cap clipped back on to complete the assembly.

In operation the appropriate repetition rate is selected for each specific gas and pressure to provide for maximum light intensity. This repetition rate selection is in the nature of a fine adjustment, since operating the system at a repetition rate of sixty kHz. will provide reasonably efficient operation for virtually all of the gases and pressures. The tuning stub 38 and slidable coupler 40 are adjusted in conventional fashion to null the output from the meter 21, thereby indicating maximum transfer of microwave energy to the gas. As previously indicated, the lamp trigger circuit 22 is used to initially excite the discharge, which is then sustained by the microwave excitation alone.

Figure 7:
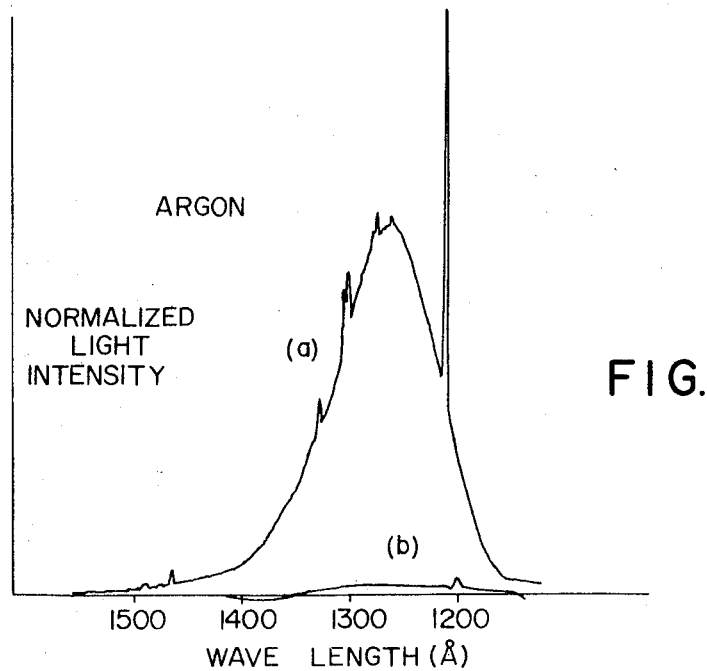
FIG. 7 is an illustration in graphical form of the light intensity as a function of wave length produced by an argon light source operated in accordance with the principles of this invention.
Figure 8:
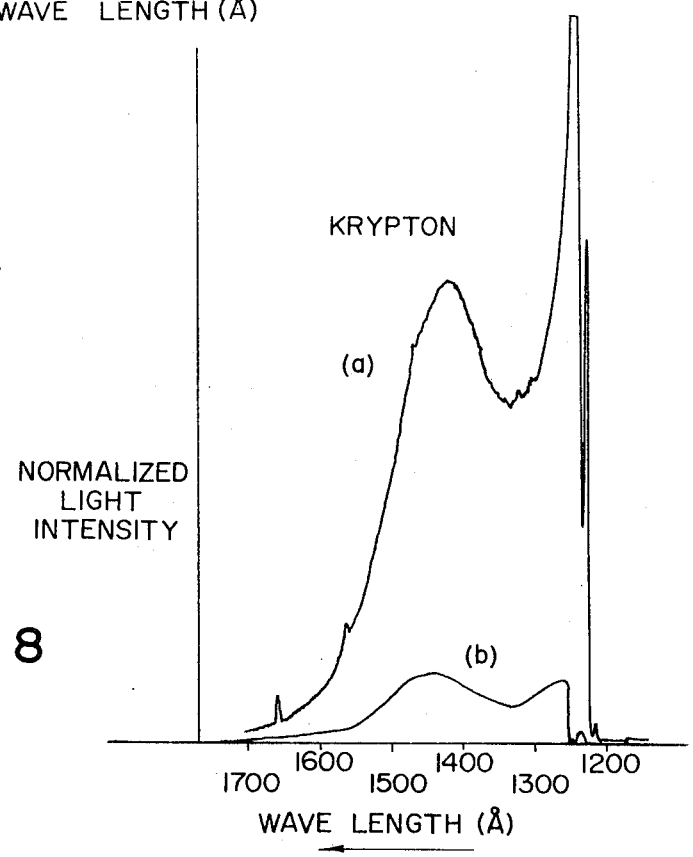
FIG. 8 is an illustration in graphical form of the light intensity as a function of wave length of a krypton light source operated in accordance with the principles of this invention.

In FIG. 7 the curve $a$ illustrates the spectral distribution of light produced by an argon filled tube operated in the pulsed microwave mode in an apparatus as illustrated in FIGS. 2 through 6. The power for each three microsecond pulse was 22 watts. Curve $b$ illustrates the same gaseous source operated in the continuous wave mode at an average power of 22 watts. In similar fashion, curve $a$ of FIG. 8 illustrates the spectral distribution of light produced with a krypton filled envelope in the apparatus of the invention operated in the pulsed mode with the peak power per pulse being 20 watts, while curve $b$ illustrates the output from the same envelope operated in the continuous wave mode with an average power of 20 watts.

While the invention has been described in terms specifically of the rare gas continuums, principles of the invention may be applied to other gases, for example, hydrogen. Again, the invention has been described in terms of sealed gas volumes. However, a flow system with differential pumping may also be employed, and with gases such as helium and neon which emit at wave lengths below 1,000 A., windows such as lithium fluoride cannot be used. In those instances the envelope would simply be a suitable conduit. The apparatus described was operated at maximum peak power of 300 watts, however, a substantial increase of light intensity should result from increasing this power. As earlier mentioned increasing continuous wave power, does not substantially increase light output in prior art devices.

While the invention has been described in terms specifically of the rare gas continuums, principles of the invention may be applied to other gases, for example, hydrogen.

The invention having been described various modifications and improvements will now occur to those skilled in the art and the invention should be construed as limited only by the spirit and scope of the appended claims.

What is claimed is:

1. A system for producing high intensity radiation in the vacuum ultraviolet region comprising,
   an envelope containing a gas to be excited;
   means for generating microwave energy;
   means coupling microwave energy from said generating means to said gas; and
   control means for energizing said microwave generating means to produce pulses of microwave energy at a repetition rate between 25 and 90 kilohertz, each of said microwave pulses having a duration between two and four microseconds.

2. A system in accordance with claim 1 wherein said coupling means is a tuned microwave cavity enclosing a portion of said envelope.

3. A system in accordance with claim 1 and further including high frequency means for initiating a gaseous discharge within said envelope, said high frequency means becoming inoperative after said discharge is initiated, said microwave energy being sufficient to sustain said discharge after initiation.

4. A system in accordance with claim 1 wherein a portion of said envelope is formed of lithium fluoride.

5. A system in accordance with claim 1 wherein a portion of said envelope is formed of magnesium fluoride.

6. A system in accordance with claim 1 wherein said pulse duration is three microseconds.

7. A system in accordance with claim 1 wherein said rare gas is argon at a pressure between 400 and 600 millimeters.

8. A system in accordance with claim 1 wherein said rare gas is krypton at a pressure between 200 and 300 millimeters.

9. A system in accordance with claim 1 wherein said rare gas is xenon at a pressure between 200 and 300 millimeters.

References Cited

UNITED STATES PATENTS

| 2,546,160 | 3/1951 | Lengyel | 250—71 |
| 2,928,937 | 3/1960 | Harman | 250—71 X |

ARCHIE R. BORCHELT, Primary Examiner

D. L. WILLIS, Assistant Examiner

U.S. Cl. X.R.

250—42; 313—201; 356—85